Sept. 28, 1965  P. SENNETT ETAL  3,208,919
METHOD AND MEANS FOR MEASURING ELECTROKINETIC POTENTIAL
Filed Nov. 20, 1962
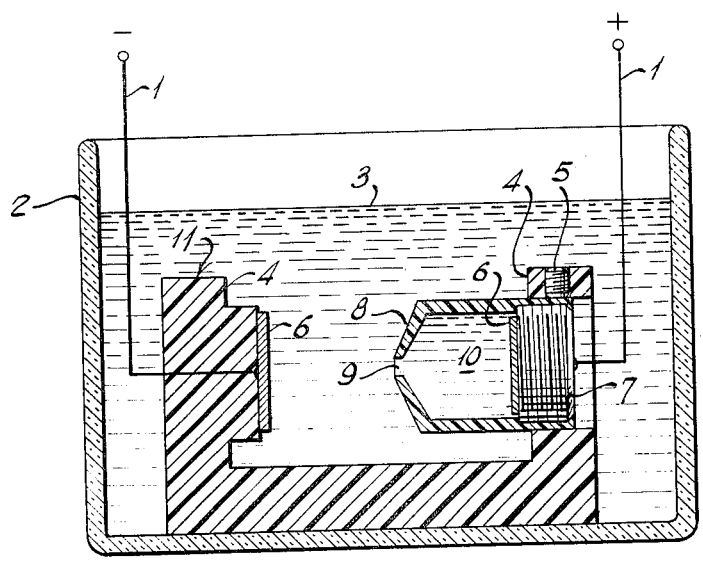
INVENTOR.
PAUL SENNETT
JAMES P. OLIVIER
BY
Blum, Moscovitz,
Friedman and Blum
ATTORNEYS United States Patent Office 3,208,919
Patented Sept. 28, 1965

3,208,919
METHOD AND MEANS FOR MEASURING ELECTROKINETIC POTENTIAL
Paul Sennett and James P. Olivier, Macon, Ga., assignors, by mesne assignments, to Freeport Sulphur Company, New York, N.Y., a corporation of Delaware
Filed Nov. 20, 1962, Ser. No. 238,922
7 Claims. (Cl. 204—1)

The present invention is concerned with improved means for determining the difference in electrical potential that exists across a colloidal solids-liquid interface. In the case of colloidal or nearly colloidal size material, this electrical potential is commonly called electrokinetic or zeta ($\zeta$) potential. More specifically, the present invention deals with an improved device for determining such electrokinetic potential characteristics of colloids in a highly reproducible manner characterized by simplicity of measurements as well as the lack of interference and complications such as those caused by gravity sedimentation which occurs in other conventional zeta potential measuring devices.

It has long been observed that colloidal or near colloidal particles migrate under the influence of an electric field at varying rates depending on the nature of the medium in which the particles are suspended, electrical charge on the colloidal particles, etc. The zeta-potential is a fundamental property of a colloidal material. It helps to explain behavior of a colloidal system. One of the main problems encountered in industrial products consisting of colloidal or near colloidal materials is the dispersion of the materials in the suspending medium. Thus it has been found that maximum dispersion is obtained when the zeta potential is at a maximum while conversely maximum aggregation of the particles (flocculation) occurs at zero potential. Thus, it is quite valuable to be able to measure accurately the zeta potential of colloidal systems since the results of the measurements can readily be employed to obtain more efficient operation.

For example, in shipping clay in the form of a slurry in tank cars, it is necessary to have the clay as well dispersed as possible (maximum zeta-potential) so that the slurry may be shipped at very high solids and still be free-flowing. Thus the use of zeta potentials to determine the optimum amount of dispersant required for a given clay suspension has obvious practical benefits. Conversely when one desires to filter a colloidal dispersion, maintaining conditions so as to minimize the zeta potential will optimize the degree of filtration obtainable. Numerous other applications wherein the measurement of zeta potential have important advantages associated therewith are well known in the art. Typically, the measurement of zeta potential is important in dispersing paints so that the pigment particles are as well dispersed as possible so as to thus obtain a paint with minimum viscosity and highest hiding power. Similarly, the flow behavior of colloidal dispersions of latex or adhesive paper coatings, etc. are directly related to the zeta potential measurements.

It thus becomes apparent that the measurement of the zeta potential represents an important tool to the colloid chemist or to those people dealing with colloidal or near colloidal dispersions. Heretofore attempts to supply a simple but accurate measuring device for determining zeta potential have proven to be unfruitful. While devices are available to measure this property of colloidal solutions, their operation is either relatively intricate or the results relatively inaccurate. Thus, for example, it has been suggested to impress a known potential across a porous cake of the colloidal material. From the measured water flow rate or pressure developed the zeta potential can be determined. However, this method requires precise manipulative techniques and it can only apply to fairly coarse particles at high solids concentrations. Investigators using this method claim an accuracy of about 5%. It has further been suggested to impress a field of known potential gradient across a dilute suspension of particles in a specially designed cell and to view the particles under microscope and thus determine their migration rates which in turn is related to the zeta potential. However, this method suffers from the severe limitation that it requires extreme dilutions of colloid and the effect of concentrations of colloid on zeta potentials cannot be determined. Accuracies of no greater than 1% have been claimed in the literature.

It has further been suggested to place a colloidal suspension in a U-tube, and then cover the top surface of the suspension with a solution of the same composition as the liquid in which the colloid is suspended. A potential is applied across two arms of the U-tube and the migration of the colloidal particles in response to the potential elevates the level of the colloid in one arm of the tube and depresses the level of the colloid in the other arm. From the rate of change of the levels in the arms of the tube, the zeta potential is calculated. However, this method generally gives an accuracy of anly 5% or so and is limited to colloidal materials that do not settle appreciably under the force of gravity since the basic movement of the colloid and liquid is of a vertical nature. Similarly, a method employing two breakers connected by an inverted U-tube has been suggested with the change in relative concentrations of the two reservoirs after a potential has been applied being then related to the zeta potential. However, this procedure again relies on relatively vertical movement of the colloidal particles and liquid and cannot be employed to determine the zeta potential of colloidal suspensions that settle appreciably under the influence of gravity. In any event some error is automatically introduced by the essentially vertical movement characteristic of this procedure.

Both of these methods require careful handling and manipulative techniques. For instance, in the moving boundary method, extreme care must be taken to prevent mixing of the two layers of material when filling the tube. During the passage of electric current the temperature must be regulated extremely closely to prevent the mixing of the two layers due to thermal currents. Any mixing of the two layers causes the boundary to become indistinct and renders the measurement inexact. If a colloidal material is nearly transparent relative to the suspending fluid, special optical and photographic techniques such as the Schlieren system are required to render the boundary visible. The present technique makes unnecessary the use of elaborate temperature controls and further there is no problem of boundary observation. An additional further important advantage of the present invention is that the measurement of the zeta potential in a wide range of colloid concentrations may be made.

In accordance with the present invention, means are taught for determining the zeta potential or similar electrical characteristics of colloidal or nearly colloidal dispersions in a manner characterized by its highly reproducible nature as well as ease of performance. More specifically, in accordance with the present invention there is employed an assembly comprising a cell at one end portion. The cell defines a relatively enclosed volume having one end portion in open fluid communication with the opposite end of the assembly. Both end portions of the assembly, namely the end of the cell as well as the opposite end of the assembly are fitted with electrodes, the electrodes being in turn connected to an outside voltage source. In use the cell is filled with a suspension of the colloid to be measured and the entire assembly immersed in a container containing additional colloidal suspension of the same composition as was placed in the cell. An electrical potential is then placed across the assembly, i.e., from one end portion within the cell to the other end portion of the assembly laterally distant from the cell. A voltage of known amount is applied for a measured period of time and the change in concentration of colloidal particles in the cell is then compared to the initial concentration measured. By use of the following physical relationship the zeta potential is readily determined.

The zeta potential of the colloid ssupended in the liquid in the cell is given by the equation:

$$\zeta = -K \frac{4\pi\eta \Delta g 9 \times 10^7}{E_A t D A (\rho - \rho_0)} \left( \frac{\rho}{C} + 1 \right)$$

Where:

$\zeta$ = Zeta potential (millivolts)
$\Delta g$ = Weight gain of cell (gms.)
$\eta$ = Viscosity of suspending liquid (poise)
$C$ = Concentration of colloid (gms./cm.$^3$)
$E_A$ = Potential applied to electrodes (volts)
$t$ = Time (sec.)
$D$ = Dielectric constant of suspending liquid
$A$ = Area of cell opening (cm.$^2$)
$\rho$ = Density of colloid (gms./cm.$^3$)
$\rho_0$ = Density of suspending liquid (gms./cm.$^3$)
$K$ = Cell constant The above physical relationship has been derived from the Helmholtz-Smoluchowski equation as given in "Textbook of Physical Chemistry," Samuel Glasstone, 2nd Ed., D. Van Nostrand Co., New York, 1946, as well as in other treatises. Thus when operating in accordance with the present invention, $\Delta g$ is determined after a given length of time $t$, in which potential $E_A$ is applied. The various other terms in the formula are dependent on the nature of the suspending liquid and are known for a given liquid. The cell constant, $K$, is experimentally determined for a cell assembly of given dimensions. The area of the cell opening may be measured directly. Thus when using the device to measure a given type of colloidal suspension employing a particular cell relatively few new values need be inserted in the equation for measurement in order to determine the zeta potential. It is noted that a cell constant, K in the formula is initially determined from the measurement of the change in weight of the cell ($\Delta g$) of a material of known zeta potential. The cell constant is a function of the dimensions of the cell and does not depend on the nature of the colloidal materials being measured.

The actual change in concentration of colloidal particles in the cell from its initial concentration can be readily measured by a change in the weight of the filled cell before and after application of voltage where the density of the colloidal particles is appreciably different from that of the suspending medium. When the difference in density of the colloidal particles and suspending medium is not large, other means of measuring concentration change, such as evaporating the liquid to dryness to determine total solids content, or chemical analysis of the cell contents can be resorted to. The electromotive potential can be varied to either have the solid particles migrate into or out of the cell depending on whether a positively or negatively charged colloid is to be measured. Generally, the voltage is applied so that the colloidal particles migrate into the cell.

In normal operations electromotive potentials of about 10 to 400 volts, preferably 50 to 100 volts for periods of time ranging from 1 to 1000 seconds, preferably 30 to 600 seconds are employed.

In actual practice, any convenient values of time and voltage may be used so long as the time is long enough and the voltage high enough to produce an easily measured change in concentration within the cell. For materials of high zeta potential, it is obvious that the potential applied may be lower and the time of application shorter than would be the case if the material were of a low zeta potential.

The cell and cell holder assembly is constructed of a material that does not conduct electricity to a substantial degree. Additionally the cell and cell holder normally will be materials resistant to chemical attack by the colloidal suspensions to be measured. Any of a wide variety of materials will suggest themselves as being suitable for use as the cell or cell holder. For example, acrylic resins such as "Lucite" or "Plexiglass" are satisfactory construction materials. Glass may alternatively be employed, as may other plastic materials. The electrodes are preferably of material that does not permit gas formation when an electric current is applied. Examples of suitable materials are zinc electrodes, silver-silver chloride electrodes, or a liquid junction electrode. The source of potential can be any conventional D.C. source such as one or more dry cells or an electronically regulated D.C. power supply.

While a cell of approximately the following dimensions has been found applicable to the laboratory studies of pigments dispersed in water, it should be understood that the dimensions of the cell are not thus limited. For industrial quality control it may be advisable to use a cell of larger dimensions while in cases where the quantity of sample is very small, an appreciably smaller cell may be used.

To minimize filling errors, the cell should have an opening smaller than the inside diameter of the cell. Cells with ⅛" and ¼" cell openings and an inside diameter of ⅞" have been used advantageously. Both electrodes are ⅞" in diameter and spaced equidistant from the cell opening. Except for the diameter of the cell opening, which must be accurately known, the dimensions above need not be precisely measured. We have found that a 1" space between the cell opening and each electrode to be a convenient distance. A cell containing from 5 to 10 ml. of colloidal suspension has been found to be convenient in pigment studies.

The advantages of the present procedure for measuring zeta potential are numerous. Both in terms of speed and simplicity measurements are easily obtained. The apparatus is easy to use as well as to clean and maintain, with individual measurements being made in a matter of a few minutes. Reproducibility of measurements on the order of 1% or less are obtainable in accordance with the present invention.

The present invention does not suffer from the errors due to gravitational effects as characterized many of the prior art procedures, since in accordance with the present invention, the colloidal particles move substantially horizontally in direction across the boundary between the cell and the surrounding environment as compared with the largely vertical movement characteristic of the prior art devices. The time of migration may be kept very short, thus further minimizing errors due to gravity sedimentation. Moreover, the present system for measuring electrokinetic potential is applicable to a wide range of materials and can be employed with almost any fine particles in suspension, either pure components or mixtures, under a wide variety of conditions. It should be understood that this device is not limited to suspensions of solid particles in solution, since the zeta potential of liquid-in-liquid suspensions (emulsions) may also be measured.

The various aspects and modifications of the present invention will be made more clearly apparent by reference to the following drawing, description and accompanying examples.

With reference to the drawing, shown therein is apparatus employing the concept of the present invention. As shown in the drawing, cell assembly 11 comprises two more or less end portions. Affixed to one end portion of the cell assembly is cell body 8. Cell body 8 in general can be any of a wide variety of geometrical configurations, e.g., cylindrical, cubic or rectangular. As shown in the drawing, it takes the form of a cylinder affixed to the overall cell assembly and having a cell opening 9 through which colloidal materials may move in response to a voltage potential impressed across the cell assembly. The entire cell assembly is immersed in container 2 which contains the suspension of the colloid whose electromotive potential characteristics are to be determined. Prior to immersion of the cell assembly in the container, cell 8 is filled with a suspension of the colloid to be measured. As shown in the drawing, cell 8 is demovable from the cell holding configuration and is normally set into the configuration by means of set screw 5 for holding the cell in place. Thus the cell interior 10 will contain, prior to the impressment of a voltage difference, the same solution as is present in container 2 and marked as reservoir 3. Both end portions 4 of the cell assembly contain electrodes 6. The electrodes themselves may take any of a wide variety of geometrical forms, they normally being a plate-like structure. The electrode 6 within the cell body 8, of course, will normally take the form of the cell body itself. Both electrodes are connected to a source of D.C current, not shown, by means of electrical leads 1. The threaded cell bottom "7" provides a means of readily dismantling the cell for filling and rapid cleanout of accumulated material after a measurement is made. While the drawing illustrates a positive lead going to the cell, it is to be understood that the relative polarities may be altered at will.

After having fixed the cell assembly in the reservoir of liquid 3, the electrical leads are connected to an external voltage source. A known voltage is applied for a determined period of time. Thereafter the change in concentration of the colloidal particles in the cell as compared with the initial concentration of said particles is measured. Thus, typically cell body 8 is thereafter removed from the holding assembly 4 and its weight may be determined and compared with the initial weight of the cell body and dispersion to be measured. This procedure is, of course, employed where there is a relatively significant difference in density between the colloidal particles and the dispersion liquid. Alternatively, where the density of the colloid and suspending medium is not large other means of measuring the concentration change of the colloids in cell body 8 such as evaporation of liquid to determine solids content can be employed.

The D.C. power source is not shown in the drawing. Preferably, when an electronic power supply is used, it should be continuously variable up to about 400 volts and also be regulated to provide a constant voltage. A current capacity on the order of about 0.2 amps is usually sufficient. Precision volt-meters and millimeters may also be included for obtaining more precise results. A timer may be conveniently included as part of the overall electrical assembly so as to measure the time during which the given voltage is impressed.

With respect to the drawing, measurements of the various elements shown therein are typically as follows:

Container 2 may take the form of a 600 ml. glass laboratory beaker and contains the colloidal suspension whose zeta potential is to be determined. Cell holding assembly 11 is a single "Plexiglass" structure which is fitted to house electrode 6 on its end portion. Cell body 8 conveniently takes the form of a 7/16" diameter by 1" long "Plexiglass" container having a threaded bottom portion and adapted to be fitted into end 4 of cell body holder so as to define an enclosed area 10. In the present example, cell opening 9 is .079 square centimeters. The distance from cell opening 9 to electrode 6 is about 2.54 cm. (1 inch) and the total distance across the electrodes is about 5.08 cm. (2 inches).

A dispersion of about 0.5 gram of kaolin per cubic centimeter of suspension is measured for its electrokinetic potential. A potential difference of about 100 volts is impressed across the electrodes for a period of time of about 120 seconds. In the case of kaolin dispersions, thereafter the cell assembly need simply be removed from container 2, cell body 8 being removed so as to maintain the solution resulting from the impression of the voltage difference in the cell interior 10. The total cell assembly or alternatively only the contents of cell body 8 may then be weighed (after drying by wiping the cell exterior to remove extraneous droplets) and compared with the initial weight of the same so as to determine the weight gain of the cell contents. Thereafter, the resulting measurements are employed in the formula described previously and the zeta potential calculated.

The operation of the present invention will be made more apparent by reference to the following specific examples. In these examples the specific illustrative cell structure described above was employed.

EXAMPLE 1

*Determination of cell constant K*

400 g. of a fine particle size water washed Georgia coating clay was slurried in 400 g. of water with 1.20 g. of tetrasodium pyrophosphate as a dispersant. The cell was filled with slurry and found to weigh 28.3147 g.

The cell was then placed in the cell holder assembly. The assembly was placed in a beaker of the clay slurry and 100 volts was applied across the electrodes for a period of 60 seconds. The cell was removed from the slurry, carefully wiped dry and again weighed. It was found to weigh 28.5940 g. for a weight gain ($\Delta g$) of 0.2793 gram.

The temperature of the slurry was 33.5° C. From the previously given formula a value of $\zeta/K$ of $-44.7$ mv. was obtained. This procedure was repeated twice and additional values $\zeta/K$ of $-47.2$ mv. and $-46.5$ mv. were obtained. This procedure was further repeated using longer times of application of voltage and the results of $\zeta/K$ obtained were extrapolated to $t=0$. This procedure is necessary since the values of $\zeta/K$ obtained may vary somewhat with the time of applying voltage. The value of $\zeta/K$ at $t=0$ obtained was $-46.5$ mv. Using a standard Northrup-Kunitz cataphoresis cell, a zeta potential of $-72.5$ mv. was obtained for this clay. Since $$K=\frac{\zeta}{46.5}$$

a cell constant, K, equal to 1.56 was obtained.

EXAMPLE 2

A sample of the same acid clay referred to in Example 1 was slurried in water to give a suspension containing 44.9% by weight of the clay. 0.13% (based on the weight of the dry clay) of tetrasodium pyrophosphate was added as a dispersant. Using a new cell with a constant of 0.56 (determined in the manner of Example 1) a $\Delta g$ of 0.1540 g. was obtained by passing 100 volts through the cell assembly for 60 seconds. When 100 v. was passed for 120 seconds a $\Delta g$ of 0.3027 g. was obtained. The above corresponds to $-57.5$ millvolts and $-56.3$ millivolts respectively, as an apparent zeta potential. By extrapolating to zero time, a true zeta potential of $-58.7$ millivolts was obtained.

EXAMPLE 3

100 g. of a commercial dispersed pigment grade titanium dioxide was slurried in water and diluted to 1 liter. By the method described in Example 1 a $\Delta g$ of 0.2184 g. was obtained when 100 volts were applied to the cell for 5 minutes at 25.6° C. The cell used here was the same as in the previous example with a constant of 0.56. A zeta potential of $-88.2$ mv. was obtained.

EXAMPLE 4

The titanium dioxide slurry of Example 3 was treated with 0.01 g. $Al_2(SO_4)_3 \cdot 18H_2O$ per ml. of suspension and a zeta potential of +10.7 mv. was obtained under the same conditions as given in Example 3. The Δg of the cell was —0.0290 g. A negative zeta potential indicates that the colloidal particle is negatively charged and migrates toward the anode of the cell. A positive zeta potential indicates that the colloid is positively charged and migrates toward the cathode of the system.

EXAMPLE 5

A sample of a latex emulsion containing 11.0% by weight of latex in a water suspension was placed in the cell and the cell assembly immersed in a beaker containing additional suspension. The cell used in this case had a constant of 0.56. 100 volts was applied to the electrodes for a period of 10 minutes and a Δg of 0.0109 g. was obtained. A zeta potential of —10.4 millivolts was calculated.

As shown by the above experiments and discussion, the present invention permits the zeta potential to be readily determined by a method which offers both speed and simplicity, as well as ability to measure a wide range of materials without incurring substantial errors due to gravitational affects. A high degree of reproducibility of measurement is obtained.

Having described the present invention, that which is sought to be protected is set forth in the following claims.

We claim:

1. An improved device for measuring the electrokinetic potential of colloidal particles in suspension which comprises a cell assembly of electrically insulating material adapted to be immersed in a liquid colloidal suspension, a container of electrically insulating material fitted to one end portion of said cell assembly so as to define a relatively enclosed volume, said container having an end opening in fluid communication with the area surrounding said container so as to permit lateral movement of fluid out of said container, said end opening being small enough so that displacement of said container from a liquid colloidal suspension external of the container would not cause susbstantial intermixing of the liquid colloidal suspension internal of the container with the liquid colloidal suspension external of the container, an electrode positioned internally within said container away from its open end, a second electrode positioned at the other end of said assembly laterally distant from said cell opening, means for impressing a voltage across said electrodes.

2. An improved device for measuring electrokinetic potential of a colloidal suspension which comprises a portable cell assembly of electrically insulating material adapted to being immersed in a liquid colloidal suspension, one end portion of said cell assembly containing a portion adapted to receive and hold in place a cylindrical container of electrically insulating material, said cylindrical container defining, together with said cell assembly, a relatively enclosed volume, said cylindrical container having an opening of reduced cross-section as compared with its diameter opposite its juncture to said assembly, said opening permitting the interior of said cylindrical container to be in fluid communication with its surrounding environment and thus permit lateral movement of fluid out of said container, said opening being small enough such that displacement of said cylindrical container from a liquid colloidal suspension external of the container would not cause susbstantial intermixing of the liquid colloidal suspension internal of the container with the liquid colloidal suspension external of the container, an electrode resistant to gas formation upon the impressment of an electric current positioned internally within said container proximate to its juncture to said cell assembly and away from its open end, a second electrode positioned at the other end of said cell assembly laterally distant from said container opening, means for impressing a voltage across said electrode.

3. The process of measuring an electrokinetic potential of a colloidal suspension which comprises placing a sample of said colloidal suspension in a container of electrically insulating material fixed to one end of a cell assembly of electrically insulating material, said container having an opening permitting lateral movement of said colloidal suspension out of said container to a reservoir of said colloidal suspension, said opening being small enough so that displacement of said container from the colloidal suspension external of the container does not cause substantial intermixing of the colloidal suspension internal of the container with the colloidal suspension external of the container, immersing said assembly in a reservoir of said colloidal suspension and impressing a relatively constant voltage difference across the opening of said container for a determined period of time, withdrawing said cell assembly from said reservoir and determining the change in concentration of the colloidal particles within said container and employing said measured change to determine the electrokinetic characteristics of said colloidal suspension.

4. The device of claim 1 wherein said container is cylindrical.

5. The process of claim 3 wherein a voltage in the range of 10 to 400 volts is employed for a time period of 1 to 1000 seconds.

6. The process of claim 3 wherein said colloidal suspension is a suspension of a silicous material.

7. The device of claim 4 wherein said cylindrical container is mounted in said cell assembly so as to be readily separated therefrom.

References Cited by the Examiner

UNITED STATES PATENTS 2,678,911   5/54   Chittum _____ 324—29
2,859,404   11/58  Crittendon _____ 324—30

JOHN H. MACK, *Primary Examiner.*

MURRAY TILLMAN, *Examiner.*